United States Patent [19]

Freund et al.

[11] 4,086,483
[45] Apr. 25, 1978

[54] DEVICE FOR INSTALLING WITHIN A PANEL OPENING FOR SUPPORTING AN ELECTRICAL COMPONENT OR THE LIKE

[75] Inventors: Robert F. Freund, Dayton; Wayne Sturgeon, Xenia, both of Ohio

[73] Assignee: Freund Precision, Inc., Dayton, Ohio

[21] Appl. No.: 748,949

[22] Filed: Dec. 9, 1976

[51] Int. Cl.² .......................... B60Q 3/04; F21V 17/00
[52] U.S. Cl. ............................. 362/311; 174/153 G; 248/27.1; 362/456
[58] Field of Search .............. 240/8.16, 52.1, 151, 240/152; 174/153 G; 248/27.1; 340/381

[56] References Cited

U.S. PATENT DOCUMENTS

| | | | |
|---|---|---|---|
| 2,248,399 | 7/1941 | Watts | 240/8.16 X |
| 3,007,599 | 11/1961 | Greasley | 240/8.16 X |
| 3,115,308 | 12/1963 | Stark | 240/8.16 |
| 3,229,939 | 1/1966 | Hubbard | 248/27.1 |
| 3,358,136 | 12/1967 | Greasley | 240/8.16 |
| 3,849,641 | 11/1974 | Plana | 240/8.16 X |

*Primary Examiner*—Richard A. Wintercorn
*Assistant Examiner*—M. L. Gellner
*Attorney, Agent, or Firm*—Jacox & Meckstroth

[57] ABSTRACT

An electrical component is supported within a housing molded of a plastics material, and the housing has an external groove which is interrupted by a plurality of peripherally spaced slots extending axially through the forward end portion of the housing. The slots provide for partially collapsing the forward end portion of the housing in response to pressing the housing into an opening within a panel so that the panel snap-fits into the groove. A retaining member is also molded of a plastics material and is mounted on the forward end portion of the housing to cover the slots. The retaining member has a corresponding plurality of circumferentially spaced and integrally molded ribs which are pressed axially into the slots to lock the housing firmly to the panel. The slots and ribs may have interfitting teeth to produce a permanent lock, and the retaining member can be adapted to carry a lens or other part which snap-fits into an annular recess formed by the retaining member.

13 Claims, 5 Drawing Figures

U.S. Patent     April 25, 1978     4,086,483
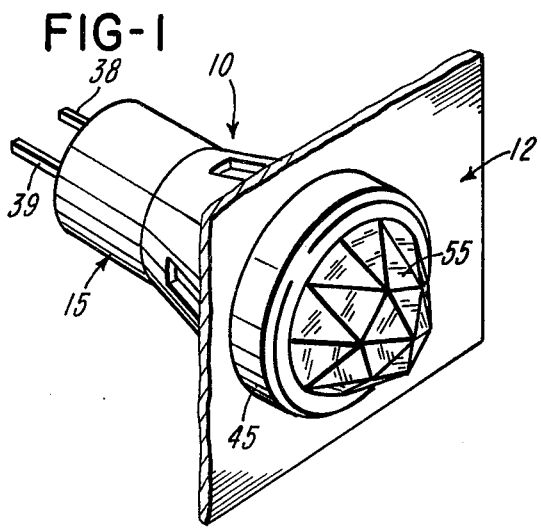
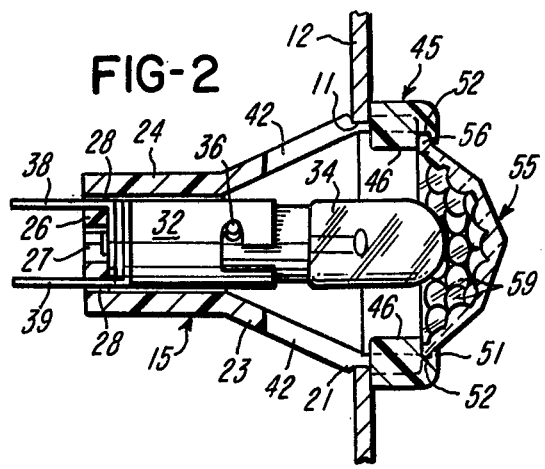
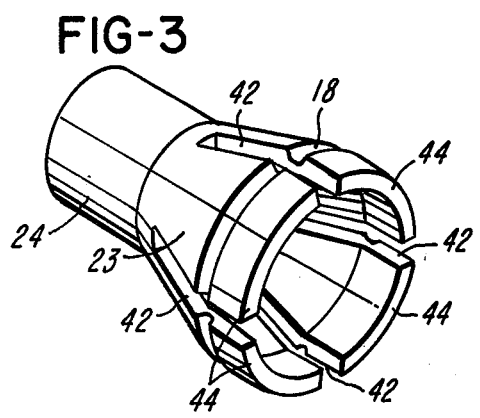
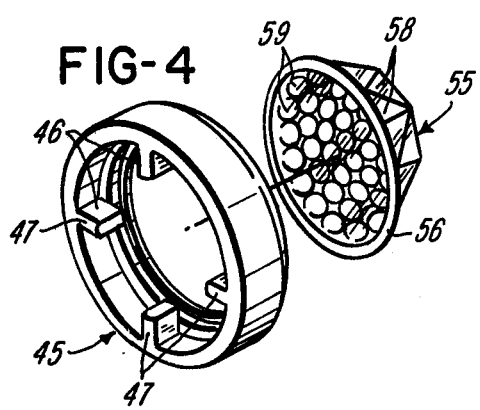
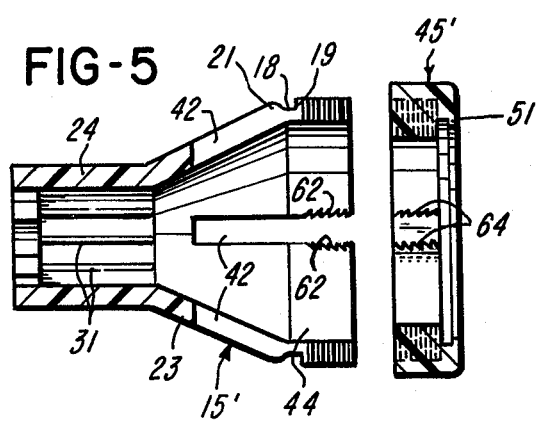

DEVICE FOR INSTALLING WITHIN A PANEL OPENING FOR SUPPORTING AN ELECTRICAL COMPONENT OR THE LIKE

BACKGROUND OF THE INVENTION

Various devices have been constructed or proposed for mounting a light source or other electrical component onto a panel such as a sheet metal instrument panel or control panel of an electrical control unit or other electrical device. One commonly used device for mounting an electrical lamp socket to a panel, includes a U-shaped metal bracket having a rear flange which supports the lamp socket and a front flange with a circular opening aligned with a circular opening formed in the panel. An externally threaded tubular metal bushing extends through the aligned openings and receives a nut for securing the bracket to the panel. Usually the metal bushing supports a translucent lens which projects forwardly from the panel and covers a lamp element inserted into the socket. The lens may be removable to provide for replacing the lamp element when required.

It has been found that substantial time and labor is required for installing such a U-shaped metal bracket and threaded bushing for supporting a removable lamp socket or other electrical component, and this time and labor become very significant when the component is used in a product produced in high volume. Furthermore, the cost of producing the metal brackets and threaded bushing and nuts is sometimes greater than the cost of producing the electrical component. Moreover, when the product is subject to vibration, it is also possible for the nut to vibrate loose causing a loss of ground, and thus a lock washer or other locking means are usually required for securing the nut after it is tightened.

SUMMARY OF THE INVENTION

The present invention is directed to an improved and simplified device which is adapted for mounting an electrical component on a panel such as a control panel or instrument display panel. The electrical component may consist of an audio or a visual signal device such as a signal light or buzzer or a control device such as a switch. The mounting device of the invention is simple in construction and, as a primary feature, significantly reduces the time, labor and costs for installing a device or component within a opening formed in a panel. The device of the invention also provides for a neat and clean appearance, and assures that the component is positively locked to the panel so that it will not vibrate loose.

In accordance with one embodiment of the invention, the above features and advantages are provided by a device which incorporates a housing molded of a plastics material and which includes a forward end portion having a circumferentially extending external groove. A plurality of circumferentialy spaced slots extend axially through the forward end portion of the housing to interrupt the groove and define therebetween a series of arcuate housing segments. The housing segments are compressed together for partially collapsing the housing in response to pressing the housing axially into an opening formed within a support panel which snap-fits into the groove. A retaining member is molded of a plastics material and is pressed onto the forward end portion of the housing. The retaining member includes a plurality of inwardly projecting ribs which wedge into the corresponding slots and thereby press the housing segments outwardly into firm engagement with the panel. The retaining member also surrounds the forward end portion of the housing to cover the slots and may be plated to provide a decorative appearance. When an electrical light source or lamp element is supported by the housing, the retaining member supports a light transmitting lens which snap-fits into an annular recess formed within the retaining member.

Other features and advantages of the invention will be apparent from the following description, the accompanying drawing and the appended claims.

BRIEF DESCRIPTION OF THE DRAWING

FIG. 1 is a perspective view of a signal light device constructed and installed on a panel in accordance with the invention;

FIG. 2 is an axial section of the signal light device shown in FIG. 1;

FIG. 3 is a perspective view of the housing forming part of the device shown in FIGS. 1 and 2;

FIG. 4 is an exploded perspective view of the retaining member and lens which are mounted on the housing shown in FIG. 3; and FIG. 5 is an exploded axial section of a housing and retaining member incorporating a modification in accordance with the invention.

DESCRIPTION OF THE ILLUSTRATED EMBODIMENTS

Referring to FIGS. 1 and 2, a light signal device 10 is constructed for installation within a circular hole or opening 11 formed within the sheet metal panel 12. The device includes a tubular body or housing 15 which is molded of a semirigid plastics material and which includes a generally cylindrical forward end portion. A circumferentially extending external groove 18 is formed within the forward end portion between a radial shoulder 19 and a circumferentially extending ridge 21 having a rounded outer surface. The housing 15 also includes a frusto-conical portion 23 which integrally connects the forward end portion to a tubular or hollow cylindrical rearward end portion 24. The cylindrical portion 24 has an integrally molded rearward end wall 26 in which is formed a circular center opening 27 and a pair of diametrically opposed slots 28.

A series of axially and peripherally spaced small ribs 31 (FIG. 5) project inwardly within the cylindrical housing portion 24, and a cylindrical sheet metal light socket 32 is pressed into the cylindrical housing portion 24 so that it is firmly engaged by the ribs 31. The socket 32 supports a light source in the form of a lamp element 34 which is releasably coupled to the socket 23 by a bayonet-type connection 36. Electrical power is supplied to the lamp element 34 through a set of narrow sheet metal conductors 38 and 39 which extend rearwardly from the socket 32 through the corresponding slots 28 within the rearward end wall 26 of the housing. The conductors 38 and 39 may be twisted or deformed after the socket 32 is pressed into the housing portion 24 in order to lock the socket 32 within the housing. However, the tight press fit produced by the ribs 31 firmly engaging the socket 32, provide a positive mounting and precise concentric alignment of the lamp socket 32 within the housing 15.

A series of four circumferentially spaced slots 42 are formed within the forward end portion of the housing 15 and extend axially into the frusto-conical portion 23 of the housing so that the slots interrupt the groove 18.

The slots 42 divide the forward end portion of the housing 15 into a series of four equal arcuate segments 44. To install the housing 15 on the panel 12, the housing 15 is pressed into the opening 11 causing the segments 44 to be cammed or pressed inwardly thereby partially collapsing the forward end portion of the housing. When the shoulder 19 abuts the panel 12, the segments 44 spring outwardly so that the panel snap-fits into the groove 18. The forward end of the frusto-conical housing portion 23 and the rounded outer surface of the ridge 21 cooperate to cam the housing sections 44 inwardly when the housing 15 is pressed into the panel opening 11.

An annular bezel or retaining member 45 is also molded of a semi-rigid plastics material and is mounted on the forward projecting end portion of the housing formed by the segments 44. The retaining member includes two pairs of diametrically opposite integrally molded ribs 46 which project inwardly into the corresponding slots 42. Each of the ribs 46 has a semi-cylindrical inner surface 47, and the width of each rib 46 is slightly greater than the normal width of the corresponding slot 42. Thus when the retaining member 45 is pressed onto the housing segments 44, the ribs 46 are wedged between the housing sections 44 so that the housing sections are slightly expanded and are pressed outwardly against the circular panel edge defining the opening 11. This wedging action of the ribs 46 and the close fit of the retaining member 45 surrounding the housing segments 44, produce a high friction gripping action which positively secures the retaining member 45 to the forward end portion of the housing 15. For the purpose of a decorative appearance, the molded plastic retaining member 45 is chrome plated so that it provides the appearance of a smooth metal ring or band.

The retaining member 45 has a circumferentially extending integral lip 51 which projects inwardly by a few thousandths of an inch in front of the ribs 46 to define a slight undercut recess 52. A dome-shaped lens 55 is molded of a red translucent plastics material and includes an outwardly projecting peripheral flange 56 which snap-fits into the recess 52 when the lens 55 is pressed into the retaining member 45 and the flange 56 engages the ribs 46. As illustrated, the lens 55 has triangular facets 58 forming its outer surface and part spherical inwardly projecting beads 59 forming its inner surface.

FIG. 5 shows a housing 15' and a retaining member 45' which are constructed substantially the same as the housing 15 and retaining member 45 described above. Accordingly, the same reference numbers are used for corresponding structure. The only differences between the housing and retaining member shown in FIG. 5 and those described above in connection with FIGS. 1-4, is that each of the slots 42 has a series of opposing serrations of teeth 62 along the forward end portion of each slot. Similarly, each of the ribs 46 is provided with corresponding reverse serrations or teeth 64. Thus when the retaining member 45' is pressed onto the forward end portion of the housing 15', the teeth 64 engage the teeth 62 so that the retaining member 45' is permanently locked to the housing 15' and cannot be removed without a substantial force sufficient to strip the teeth. The modification shown in FIG. 5 is particularly suited for use on installations where it is not necessary to provide for obtaining access to the interior of the housing, such as is necessary in connection with the embodiment shown in FIGS. 1-4 for replacing the lamp bulb 34.

From the drawing and the above description, it is apparent that a mounting device constructed in accordance with the present invention, provides desirable features and advantages. As a primary feature, the housing 15 or 15' and the retaining member 45 or 45' can be quickly installed within an opening formed within a wall or panel, simply by pressing the housing into the opening until the panel seats within the groove 19, and then pressing the retaining member onto the housing in order to lock the panel within the groove. Furthermore, the components of the device are simple and inexpensive in construction and can be quickly produced in relatively inexpensive plastic injection molds with no slides.

The lamp socket can also be quickly installed within the housing simply by pressing the metal casing of the housing into the tubular portion 24 of the housing after the electrical conductors 38 and 39 are aligned with the corresponding slots 28. In the event that it is desired to form a electrical ground connection between the metal casing of the lamp socket 32 and the sheet metal panel 12, a metal coating may be deposited or plated onto the inner and outer surfaces of the housing. The press fit of the socket 32 against the metal coated ribs 31, and the press fit of the metal plated housing against the raw edge of the metal panel 12 forming the opening 11, is effective to produce a dependable electrical ground connection through the metal coating from the socket to the sheet metal panel 12. The opening 11 within the panel 12 may also be provided with a key slot for receiving a key which interrupts the groove 18 and is molded as an integral part of one of the housing segments 44 to prevent rotation of the housing.

While the forms of device herein described constitute preferred embodiments of the invention, it is to be understood that the invention is not limited to these precise forms, and that changes may be made therein without departing from the scope and spirit of the invention as defined in the appended claims.

The invention having thus been described, the following is claimed:

1. In a device adapted to be installed within an opening in a panel for supporting an electrical component or the like, said device including a hollow housing adapted to extend through the opening, said housing having an annular forward end portion projecting forwardly of the panel and an annular rearward end portion projecting rearwardly from the panel, means defining a peripherally extending external groove within said housing between said forward and rearward end portions for receiving the panel, means defining a slot within said housing and extending rearwardly through said forward end portion and interrupting said groove, said slot providing for partially collapsing said forward end portion of said housing or inserting said housing into the opening until the panel seats within said groove, the improvement comprising a retaining member mounted on said forward end portion of said housing and including an annular portion surrounding said forward end portion and covering said slot, a rib projecting inwardly from said annular portion of said retaining member into said slot, and said rib is effective to prevent collapsing of said forward end portion of said housing after said groove receives the panel and to effect a positive locking of said housing to the panel.

2. A device as defined in claim 1 wherein said rib projects radially inwardly from said annular portion of said housing.

3. A device as defined in claim 2 wherein said retaining member includes a lip portion projecting inwardly from said annular portion, said retaining member includes a plurality of said circumferentially spaced said ribs projecting inwardly in axially spaced relation to said lip portion, a cover element including a peripheral flange portion seated between said ribs and said lip portion, and said housing includes a corresponding plurality of said slots for receiving said ribs.

4. A device as defined in claim 1 and including a lens element secured to said annular portion of said retaining member.

5. A device as defined in claim 1 wherein said housing comprises a generally frusto-conical hollow portion extending from said groove rearwardly, and a generally cylindrical tubular end portion extending rearwardly from said frusto-conical portion of said housing.

6. A device as defined in claim 5 wherein said tubular end portion of said housing includes a plurality of generally axially extending internal ribs, and an electrically actuated component is disposed within said tubular end portion firmly engaging said internal ribs.

7. A device as defined in claim 1 wherein a plurality of peripherally spaced and axially extending said slots interrupt said groove, and a plurality of peripherally spaced said ribs project inwardly from said annular portion of said retaining member into the corresponding said slots.

8. A device as defined in claim 1 wherein said slot and said rib include mating interfitting teeth for locking said retaining member onto said housing.

9. In a device adapted to be installed within an opening in a panel for supporting an electrical component or the like, said device including a hollow housing of molded plastics material and adapted to extend through the opening, said housing having a generally cylindrical forward end portion projecting forwardly of the panel and an annular rearward end portion projecting rearwardly from the panel, means defining a peripherally extending external groove within said housing between said forward and rearward end portions for receiving the panel, means defining a plurality of peripherally spaced slots within said housing and extending rearwardly through said forward end portion and interrupting said groove, said slots providing for partially collapsing said forward end portion of said housing for inserting said housing into the opening until the panel seats within said groove, the improvement comprising a retaining member mounted on said forward end portion of said housing and including an annular portion surrounding said forward end portion and covering said slots, said retaining member including a corresponding plurality of peripherally spaced ribs projecting inwardly from said annular portion into said slots, and said ribs being effective to press into said slots to prevent collapsing of said forward end portion of said housing after said groove receives the panel and to effect a positive locking of said housing to the panel.

10. A device as defined in claim 9 wherein said retaining member includes an inwardly projecting annular lip spaced in front of said ribs, and a cover member having an outwardly projecting peripheral flange disposed between said lip and said ribs.

11. A device as defined in claim 10 wherein said cover member comprises a lens of light transmitting material.

12. A device as defined in claim 9 wherein said rearward end portion of said housing includes a substantially cylindrical tubular portion having a diameter smaller than the diameter of said forward end portion, and an electrical lamp socket is press-fitted within said tubular portion.

13. A device as defined in claim 9 wherein said rearward end portion of said housing encloses an electrical lamp socket, said housing having means firmly engaging said lamp socket, and a light transmitting lens secured to said retaining member.

* * * * *